March 24, 1925.

H. B. WATSON ET AL 1,531,053

STEAM ENGINE

Filed Aug. 31, 1921

INVENTORS:
HENRY B. WATSON,
TORBEN C. BILLETOP.
by Spear, Middleton, Donaldson & Hall.
Attys

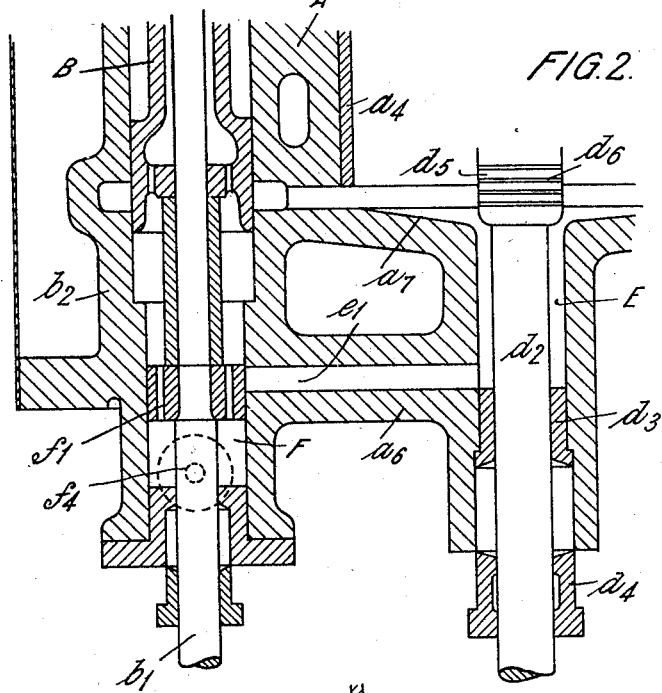
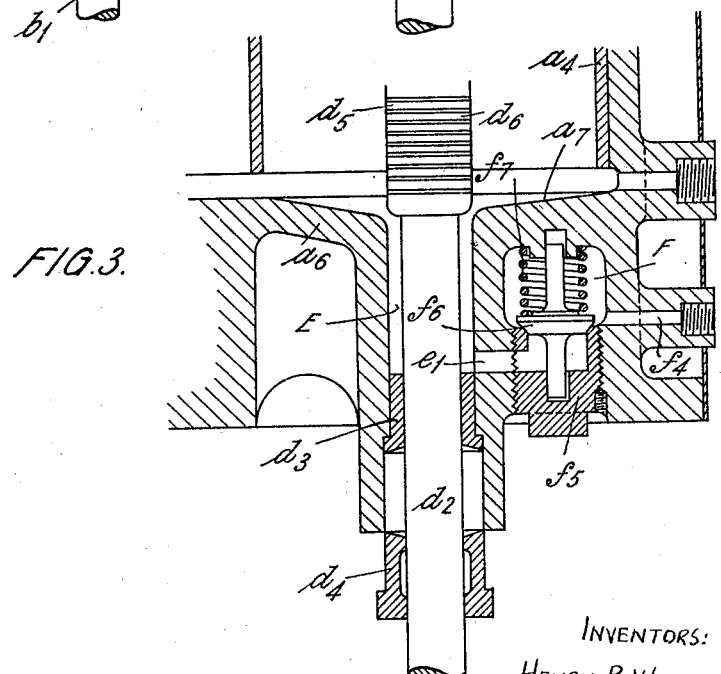

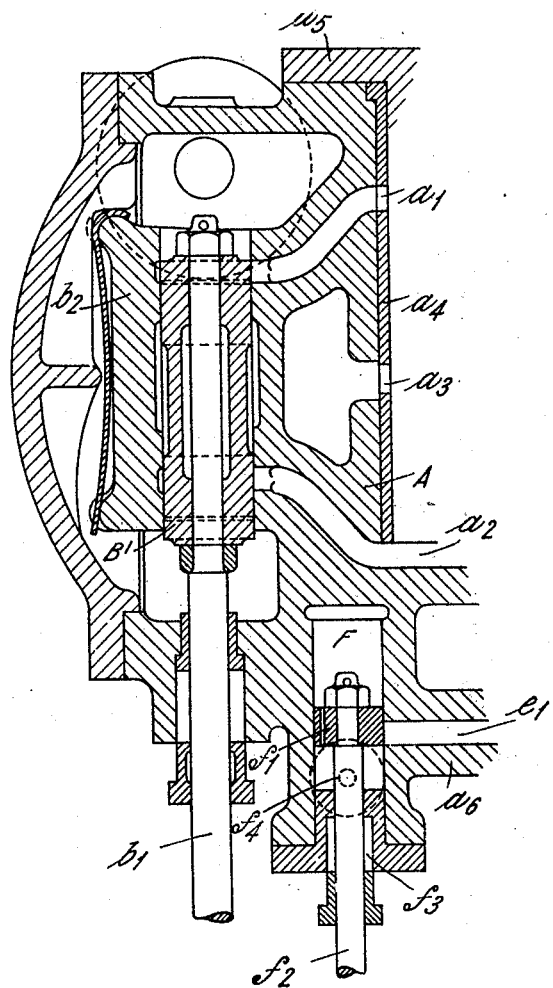

March 24, 1925.  1,531,053
H. B. WATSON ET AL
STEAM ENGINE
Filed Aug. 31, 1921  4 Sheets-Sheet 4
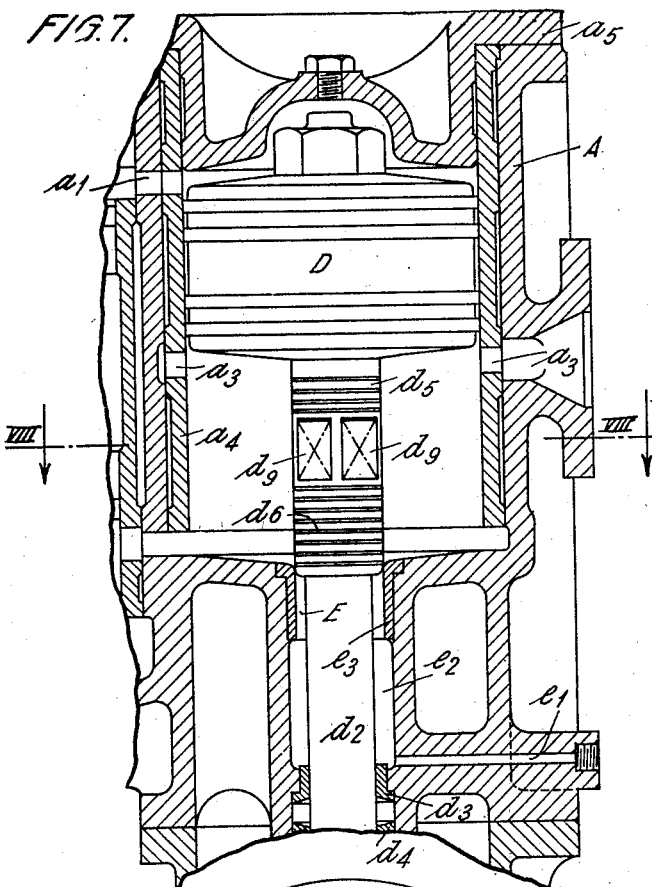
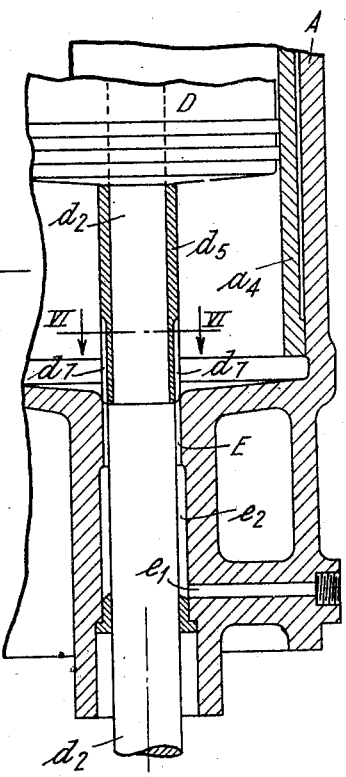
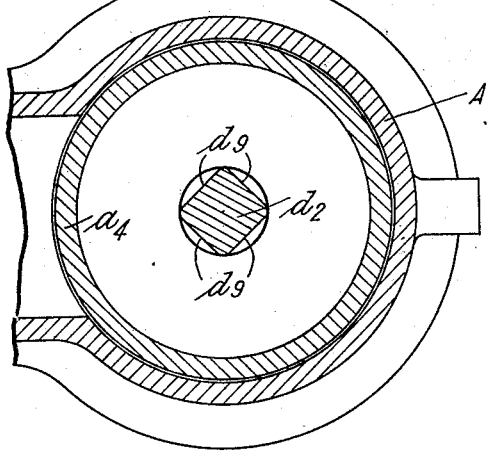
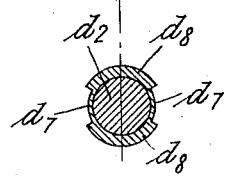
INVENTORS:
HENRY B. WATSON,
TORBEN C. BILLETOP.
by Spear, Middleton, Donaldson & Hall.
Attys.

Patented Mar. 24, 1925.

1,531,053

UNITED STATES PATENT OFFICE.

HENRY BURNETT WATSON AND TORBEN CHRISTIAN BILLETOP, OF NEWCASTLE-ON-TYNE, ENGLAND.

STEAM ENGINE.

Application filed August 31, 1921. Serial No. 497,240.

(GRANTED UNDER THE PROVISIONS OF THE ACT OF MARCH 3, 1921, 41 STAT. L., 1313.)

*To all whom it may concern:*

Be it known that we, HENRY BURNETT WATSON and TORBEN CHRISTIAN BILLETOP, subjects of the King of Great Britain, residing in the city and county of Newcastle-on-Tyne, England, have invented certain new and useful Improvements in Steam Engines, of which the following is a specification.

This invention relates to steam engines and has reference more particularly to means for ensuring the automatic drainage of water condensed in or carried into the cylinder of vertical engines of the uniflow type with central belt exhaust ports, and the object of the invention is to so construct engines of this type that they shall be self-draining under all conditions and thus enable a very high speed and enhanced economy to be obtained.

According to the invention, we drain the cylinder by forming in the cylinder end a cavity into which the drainage water is adapted to gravitate, said cavity being connected through a drain control valve to a drainage outlet, and the piston of the engine being fitted with a plunger adapted to work in said cavity in fluid-tight manner and to expel the condensed water through the valve which is arranged to open whilst the said cavity is cut off from the cylinder interior by the plunger. In the uniflow type of engine having a central belt of exhaust ports, the plunger enters the cavity immediately the piston on its downstroke covers the exhaust ports; the cavity is usually arranged concentrically with the piston rod and the plunger is formed by enlarging the portion of the rod next to the piston. The valve may be positively operated by the engine mechanism, or it may be of the automatic spring-controlled non-return type.

The invention, applied by way of example to a vertical engine of the uniflow type, is illustrated in the accompanying drawings, in which:—

Fig. 2 is a fragmentary view of a portion similar to Fig. 1, and shows the drainage valve arranged on the same spindle as the steam distribution valve;

Fig. 3 is a fragmentary sectional view, showing an arrangement of automatic spring controlled drainage valve;

Fig. 4 shows the arrangement when the steam distributing valve is of that type in which the outer edges control the steam ports.

Fig. 5 is a fragmentary elevation in medial section showing a modification of the plunger and drainage cavity and Fig. 6 is a plan in section on the line VI, VI, of Fig. 5.

Fig. 7 is a view similar to Fig. 5, showing a further modification of the plunger, and Fig. 8 is a plan in section on the line VIII, VIII, of Fig. 7.

Figure 1:
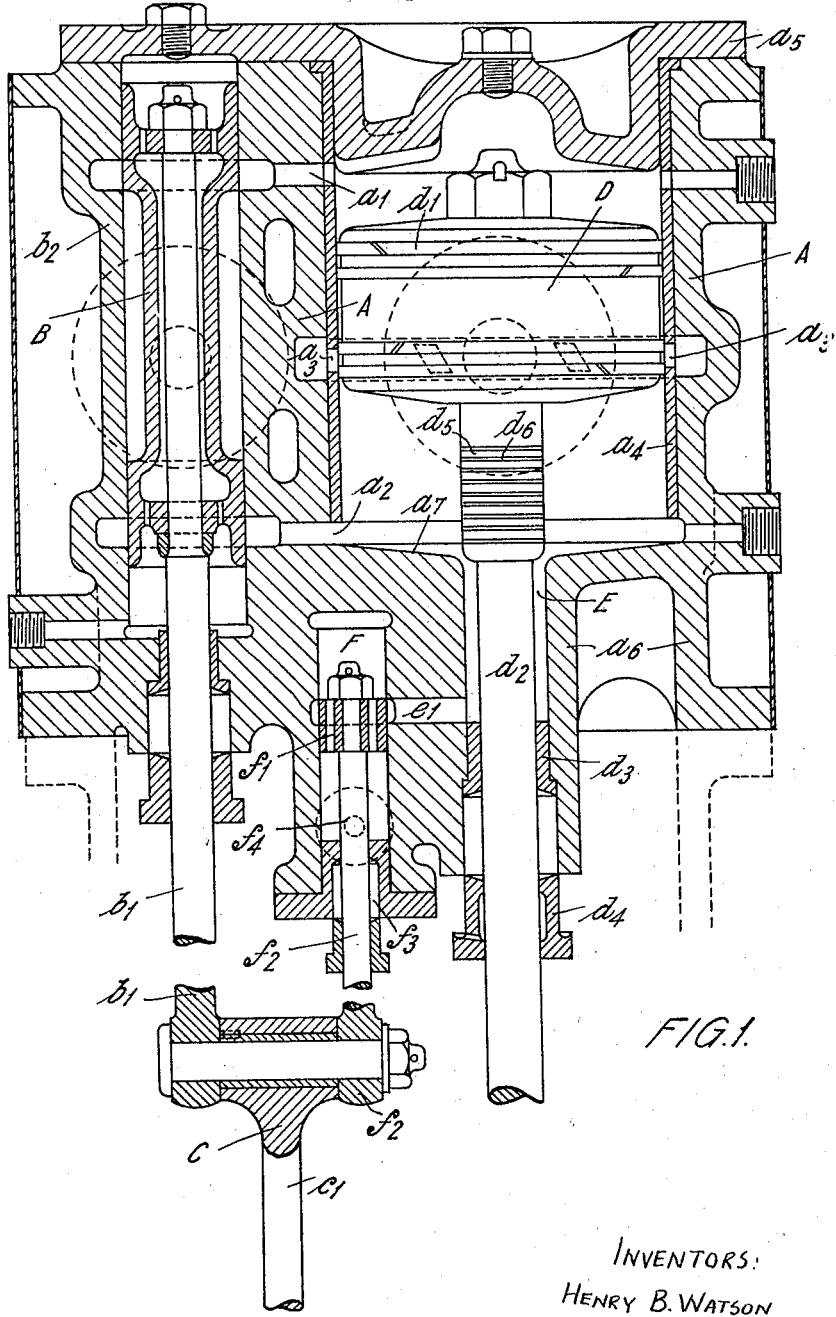
Fig. 1 is an elevation in conventional section, to show the cylinder ports and the respective valves.

Referring in the first place to Fig. 1,—

The cylinder A is fitted at its extreme ends with steam ports, $a^1$ and $a^2$ which as in the arrangement illustrated are preferably of the straight through type; these ports may be controlled by any suitable type of valve, the ordinary piston valve B shown being preferred, the valve spindle $b^1$ of which is operated in any convenient manner say from a crosshead C on the eccentric rod $c^1$. The cylinder is also fitted with the usual belt of exhaust ports at the centre $a^3$ and is usually fitted with an internal liner $a^4$ in which these ports are formed; the exhaust ports are controlled by the edges of a deep piston D fitted to this type of engine. $a^5$ is the cylinder cover, $a^6$ the cylinder end, and $b^2$ the valve casing, all of which, except as described herein, may be of the usual construction.

The action of the engine in respect to the steam ports $a^1$ and $a^2$, and the exhaust ports $a^3$, thus located and controlled is similar to that which obtains in the now well known uniflow type of engine; water which may be formed by condensation in, or which may be led from a priming boiler into the portion of the cylinder A above the main piston D, automatically drains away through the central belt of exhaust ports $a^3$ as the latter are uncovered when the piston D is at or near the lower end of its stroke, and the upper surface $d^1$ of the piston D may be of convex configuration as shown, to lead the drainage to the said ports $a^3$.

Water condensed in or led into the lower part of the cylinder A is automatically drained away as follows:—

The bore E, which in the usual arrangement fits the piston rod $d^2$, is, according to the invention, made larger in diameter than the said rod and forms a drainage opening, E, which conveniently terminates in the neck bush $d^3$ of the usual stuffing box provided with a gland $d^4$, said neck bush being fitted to the piston rod below the lower end of the opening E; at its lower end the opening E communicates up a passage-way $e^1$ with a drainage cylinder F into which the passage-way opens by a series of annular ports controlled by a valve $f^1$; preferably the drainage cylinder F, which is of comparatively small diameter, is arranged with its axis parallel with the axis of the main cylinder A and may be conveniently located in an extension of the cylinder end and between the main rod $d^2$ and the valve rod $b^1$. The valve $f^1$ is preferably of the piston type and is reciprocated by a valve spindle $f^2$ passing out of the drainage cylinder through a stuffing box $f^3$ and connected to the crosshead C, or said valve may be operated in any other suitable manner.

The drainage cylinder F has an opening $f^4$ below the piston valve $f^1$ leading to any suitable drain.

Assuming the main piston A to be in the position shown in Fig. 1, the portion $d^5$ of the piston rod extending from the underside of the piston to the top of the annular drainage cavity E is enlarged in diameter as shown so that as the piston descends below the point of its stroke above assumed, the enlarged portion $d^5$ enters the said cavity and acts as a plunger to force any water in the said cavity out the passage-way $e^1$, drainage cylinder F, and drain $f^4$, the valve $f^1$ opening when the plunger $d^5$ enters the cavity E and remaining open whilst the plunger occupies said cavity, but closing again just before the plunger leaves the cavity E on its upward stroke.

It will be seen that during the whole time the piston D is in the upper portion of the cylinder A the drainage cavity E effectually drains the lower portion of the cylinder and that water entering the cavity E is forced out by the action of the plunger $d^5$ which may be fitted with water grooves $d^6$ to act as a seal to prevent leakage. The lower end $a^7$ of the cylinder A may be dished as shown, to guide the drainage water into the drainage cavity.

In the modification shown in Fig. 2, the arrangement is substantially similar in construction and function to that already described (and the corresponding parts are similarly lettered) except that the valve $f^1$ in the drainage cylinder F is connected directly to the valve spindle $b^1$ instead of to a separate spindle $f^2$ as in the modification just described.

The same remarks apply to the modification shown in Fig. 4; in this case the valve B′ differs in construction from that described and the valve $f^1$ now opens upwardly instead of downwardly as in the previous modifications.

In Fig. 3 the draining cylinder F is fitted with an ordinary mushroom valve seating $f^5$ adapted to be closed by a valve $f^6$, and fitted with a spring $f^7$ which normally keeps the valve closed. When the plunger portion $d^5$ descends into the opening E the pressure on the entrapped water opens the valve $f^6$ and so allows the water to pass out through the drainage outlet $f^4$.

In Figs. 5 and 6, the plunger $d^5$ is somewhat longer than in the arrangements previously described, axial grooves or channels $d^7$ being cut in the lower portion of the periphery. As before, the plunger enters the cavity E in fluid-tight manner during the completion of the piston stroke but the walls $d^8$ between the grooves or channels $d^7$ serve as guides, and do not move out of the cavity even when the piston is at the top of its stroke, the drainage being effected through the channels $d^7$, cavity E, drainage chamber $e^2$, (which is formed by enlarging the cavity E as shown,) and passage-way $e^1$. In this case the drainage is more effective, particularly during the period when the piston is moving at its slowest speed.

In Figs. 7 and 8 the arrangement of cavity E and drainage chamber $e^2$ is similar to that of Fig. 6. In this case the plunger $d^5$ works in the cavity E in fluid-tight manner during the whole of the piston stroke, the plunger being provided with a reduced medial portion, by which at the appropriate period of the stroke the condensed water is drained into the cavity E, thence into the drainage chamber $e^2$ and the passage-way $e^1$. In the example illustrated the reduced medial portion is formed by flats $d^9$, but any desired configuration may be adopted.

In Fig. 7 a renewable bush $e^3$ is shown fitted at the top of the cavity E; a similar bush may be provided in the case of each modification.

Whilst the invention, as stated, is particularly applicable to engines of the uniflow type, it will be seen that it may be applied to automatically drain the cylinders of other types of engines.

The details of construction may be modified, and any suitable form of drainage control valve may be provided in the modification illustrated.

Having now fully described our invention, we declare that what we claim and desire to secure by Letters Patent, is:—

In engine cylinders fitted with the upper and lower steam ports and a central belt of exhaust ports controlled by the piston movement after the manner of uniflow engines, the combination therewith of a drainage cavity at the lower end of the cylinder, a valve for said cavity, into which condensed water gravitates, and a plunger fitted to the said piston and adapted to enter said cavity as soon as the said piston has closed the said exhaust ports, said piston during the remainder of its down stroke actuating the plunger to force the condensed water out through a valve which opens the said cavity to the drain whilst the said cavity is cut off from the cylinder by the plunger; substantially as described.

In testimony whereof we affix our signatures in presence of two witnesses.

HENRY BURNETT WATSON.
TORBEN CHRISTIAN BILLETOP.

Witnesses:
 CHARLTON HENRY CALVERT,
 THOMAS WARDLE HESLOP.